US006867536B2

(12) United States Patent
Srivastava et al.

(10) Patent No.: US 6,867,536 B2
(45) Date of Patent: Mar. 15, 2005

(54) BLUE-GREEN PHOSPHOR FOR FLUORESCENT LIGHTING APPLICATIONS

(75) Inventors: Alok Srivastava, Niskayuna, NY (US); Holly Comanzo, Niskayuna, NY (US); Venkatesan Manivannan, Recford, NY (US); Anant Achyut Setlur, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/317,372

(22) Filed: Dec. 12, 2002

(65) Prior Publication Data

US 2004/0113537 A1 Jun. 17, 2004

(51) Int. Cl.$^7$ .................................................. H01J 1/62
(52) U.S. Cl. ........................ 313/487; 313/485; 313/486; 252/301.4 R
(58) Field of Search ..................... 252/301.4 R, 309.36, 252/301.4 F, 700, 301.4 P, 301.4 H; 313/485–487

(56) References Cited

U.S. PATENT DOCUMENTS

| | | | | |
|---|---|---|---|---|
| 3,617,357 A | * | 11/1971 | Nagy | 428/34.4 |
| 4,075,532 A | * | 2/1978 | Piper et al. | 313/487 |
| 4,079,287 A | * | 3/1978 | Soules et al. | 313/487 |
| 4,705,986 A | * | 11/1987 | Iwama et al. | 313/487 |
| 4,797,594 A | * | 1/1989 | Sigai et al. | 313/488 |
| 4,806,824 A | | 2/1989 | Paynter et al. | |
| 4,874,984 A | | 10/1989 | Sigai et al. | |
| 4,891,550 A | | 1/1990 | Northrop et al. | |
| 5,041,758 A | * | 8/1991 | Huiskes et al. | 313/487 |
| 5,049,779 A | | 9/1991 | Itsuki et al. | |
| 5,207,948 A | | 5/1993 | Wolfe et al. | |
| 5,350,971 A | | 9/1994 | Jeong | |
| 5,684,359 A | * | 11/1997 | Yano et al. | 313/487 |
| 5,714,836 A | | 2/1998 | Hunt et al. | |
| 5,731,659 A | | 3/1998 | Soules et al. | |
| 5,770,917 A | * | 6/1998 | Yano et al. | 313/486 |
| 5,838,101 A | * | 11/1998 | Pappalardo | 313/487 |
| 5,859,496 A | * | 1/1999 | Murazaki et al. | 313/485 |
| 5,869,927 A | | 2/1999 | Matsuo et al. | |
| 6,010,644 A | * | 1/2000 | Fu et al. | 252/301.4 R |
| 6,045,721 A | * | 4/2000 | Zachau et al. | 252/301.4 R |
| 6,116,754 A | | 9/2000 | Ocsovai et al. | |
| 6,117,362 A | * | 9/2000 | Yen et al. | 252/301.4 R |
| 6,137,217 A | | 10/2000 | Pappalardo et al. | |
| 6,153,971 A | * | 11/2000 | Shimizu et al. | 313/486 |
| 6,165,385 A | * | 12/2000 | Rao et al. | 252/301.4 R |
| 6,222,312 B1 | | 4/2001 | Ghosh et al. | |
| 6,249,328 B1 | | 6/2001 | Fukuzawa et al. | |
| 6,294,800 B1 | | 9/2001 | Duggal et al. | |
| 6,302,959 B2 | | 10/2001 | Srivastava et al. | |
| 6,369,502 B1 | | 4/2002 | Auber et al. | |
| 6,380,669 B1 | * | 4/2002 | Zachau et al. | 313/487 |
| 6,400,097 B1 | | 6/2002 | Jin et al. | |
| 6,402,987 B1 | | 6/2002 | Srivastava et al. | |
| 6,429,583 B1 | | 8/2002 | Levinson et al. | |
| 6,501,100 B1 | * | 12/2002 | Srivastava et al. | 257/79 |
| 6,522,065 B1 | * | 2/2003 | Srivastava et al. | 313/503 |
| 6,565,973 B2 | * | 5/2003 | Duff et al. | 428/402 |

* cited by examiner

*Primary Examiner*—Joseph Williams
*Assistant Examiner*—Dalei Dong
(74) *Attorney, Agent, or Firm*—Fay, Sharpe, Fagan, Minnich & McKee, LLP

(57) ABSTRACT

A fluorescent lamp including a phosphor layer including $Sr_4Al_{14}O_{25}:Eu^{2+}$ (SAE) and at least one of each of a red, green and blue emitting phosphor. The phosphor layer can optionally include an additional, deep red phosphor and a yellow emitting phosphor. The resulting lamp will exhibit a white light having a color rendering index of 90 or higher with a correlated color temperature of from 2500 to 10000 Kelvin. The use of SAE in phosphor blends of lamps results in high CRI light sources with increased stability and acceptable lumen maintenance over, the course of the lamp life.

19 Claims, 4 Drawing Sheets

BLUE-GREEN PHOSPHOR FOR FLUORESCENT LIGHTING APPLICATIONS

The U.S. Government has a paid-up license in this invention and the right in limited circumstances to require the patent owner to license others on reasonable terms as provided for by the terms of Contract No. DE-FC26-99FT40632 awarded by the Department of Energy.

FIELD OF INVENTION

The present invention relates to phosphor compositions, particularly phosphors for use in fluorescent lamps. More particularly, the present invention relates to red emitting phosphor for use in a fluorescent lamp and a fluorescent lamp employing the same having a high color rendering index.

BACKGROUND OF THE INVENTION

Fluorescent lamps typically have a transparent glass envelope enclosing a sealed discharge space containing an inert gas and mercury vapor. When subjected to a current provided by electrodes, the mercury ionizes to produce radiation having primary wavelengths of 185 nm and 254 nm. This ultraviolet radiation, in turn, excites phosphors on the inside surface of the envelope to produce visible light which is emitted through the glass.

Generally, a fluorescent lamp for illumination uses a phosphor which absorbs the 254 nm Hg-resonance wave and is activated so as to convert the ultraviolet luminescence of mercury vapor into visible light. In some conventional fluorescent lamps, a white-emitting calcium halophosphate phosphor, such as $Ca_{10}(PO_4)_6(F,Cl)_2$:Sb,Mn, has been used. More recently, in order to improve the color-rendering properties and emission output of fluorescent lamps, efficient illumination of a white color is provided using a three-band type fluorescent lamp which employs the proper mixture of red, green and blue-emitting phosphors whose emission spectrum occupies a relatively narrow band, has been put to practical use. For example, for the blue-emitting phosphor, europium-activated barium magnesium aluminate phosphor ($BaMg_2Al_{16}O_{27}$:$Eu^{2+}$), for the green-emitting phosphor, cerium and terbium-activated magnesium aluminate phosphor [(Ce, Tb)$MgAl_{11}O_{19}$], and for the red-emitting phosphor, europium-activated yttrium oxide phosphor ($Y_2O_3$:$Eu^{3+}$) may be used and are mixed in an adequate ratio. The combined spectral output of the phosphor blend produces a white light.

In such a three-band type phosphor lamp, the emitting colors of the respective phosphors are considerably different from one another. Therefore, if the emitting intensity of any of the three corresponding phosphors is decreased, color deviation occurs, degrading the color-rendering properties of the lamp.

The apparent color of a light source is described in terms of color temperature, which is the temperature of a black body that emits radiation of about the same chromaticity as the radiation considered. A light source having a color temperature of 3000 Kelvin has a larger red component than a light source having a color temperature of 4100 Kelvin. The color temperature of a lamp using a phosphor blend can be varied by changing the ratio of the phosphors.

Color quality is further described in terms of color rendering, and more particularly color rendering index (CRI or $R_a$), which is a measure of the degree to which the psycho-physical colors of objects illuminated by a light source conform to those of a reference illuminant for specified conditions. CRI is in effect a measure of how well the spectral distribution of a light source compares with that of an incandescent (blackbody) source, which has a Planckian distribution between the infrared (over 700 nm) and the ultraviolet (under 400 nm). The discrete spectra which characterize phosphor blends will yield good color rendering of objects whose colors match the spectral peaks, but not as good of objects whose colors lie between the spectral peaks.

The color appearance of a lamp is described by its chromaticity coordinates which can be calculated from the spectral power distribution according to standard methods. See CIE, *Method of measuring and specifying color rendering properties of light sources* (2nd ed.), Publ. CIE No. 13.2 (TC-3,2), Bureau Central de la CIE, Paris, 1974. The CIE standard chromaticity diagram includes the color points of black body radiators at various temperatures. The locus of black body chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color. Luminous efficacy of a source of light is the quotient of the total luminous flux emitted by the total lamp power input as expressed in lumens per watt (LPW or lm/W).

Spectral blending studies have shown that the luminosity and CRI of white light sources are dependent upon the spectral distribution of color components. Blue or bluish-green phosphors are important components, the performance of which is important to maximize CRI. It is expected that such phosphors preserve structural integrity during extended lamp operation such that the phosphors remain chemically stable over a period of time while maintaining stable CIE color coordinates of the lamp. For class M and AAA high color rendering fluorescent lamps, a bluish-green phosphor is highly desired. Such phosphors can be used in conjunction with existing 3-band lamps to increase the lamp's CRI.

Thus, a need exists for a blue-green phosphor that can be used in phosphor blends to produce fluorescent lamps having an increased CRI while remaining stable and relatively maintenance free.

SUMMARY OF THE INVENTION

In one aspect, the invention provides a phosphor blend including at least one of each of a red phosphor, a blue phosphor and a green phosphor and $Sr_4Al_{14}O_{25}$:$Eu^{2+}$.

In another aspect, the present invention provides a phosphor blend including $Sr_4Al_{14}O_{25}$:$Eu^{2+}$ and at least one of each of a red phosphor, a blue phosphor, a green phosphor.

In a third aspect, the present invention provides an arc discharge lamp including $Sr_4Al_{14}O_{25}$:$Eu^{2+}$ and having a CRI of from 90–94 and a correlated color temperature of from 2500–10000 Kelvin.

DETAILED DESCRIPTION OF THE INVENTION

Figure 1:
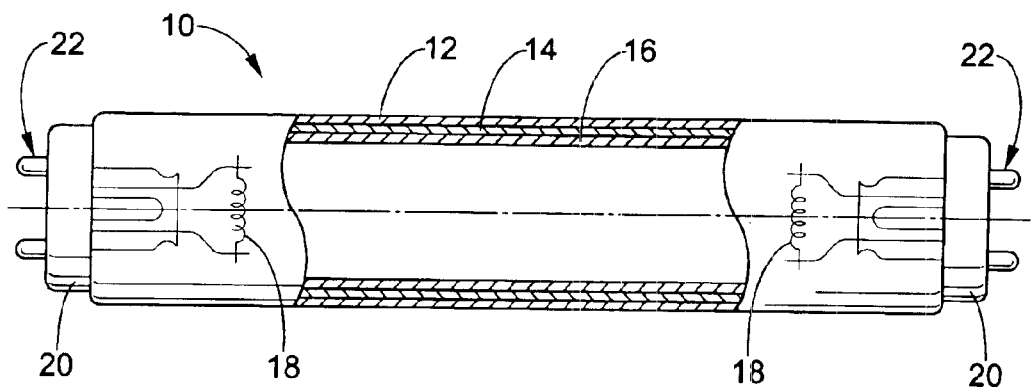
FIG. 1 is a schematic cross-section of a fluorescent lamp.
Figure 2:
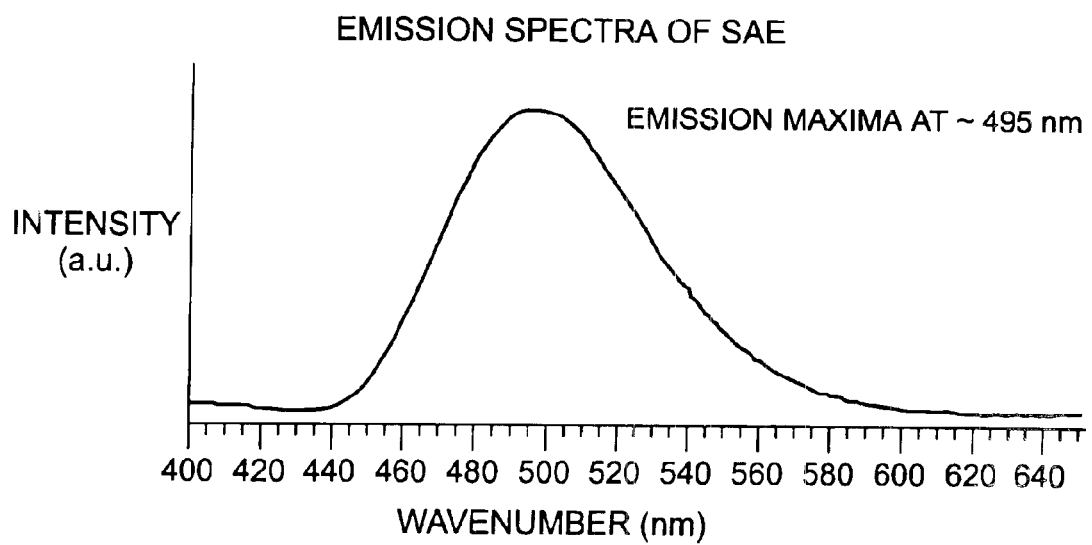
FIG. 2 is a plot of the emission spectra of $Sr_4Al_{14}O_{25}$:$Eu^{2+}$ (SAE).

Referring to FIG. 1, there is depicted a representative fluorescent lamp 10 comprising an elongated soda-lime silicate glass envelope 12 having a circular cross-section. The low pressure mercury discharge assembly in said lamp includes a pair of spaced conventional electrode structures 18 at each end connected to electrical contacts 22 of a base 20 fixed at both ends of the sealed glass envelope. The discharge-sustaining filling in said sealed glass envelope is an inert gas such as argon or a mixture of argon and other rare earth gases at a low pressure in combination with a small quantity of mercury to provide the low vapor pressure manner of lamp operation. Deposited on the inner surface of the glass envelope is a phosphor blend layer 16 according to the present invention. In one embodiment of the invention, the lamp 10 can have a second layer of material 14 positioned between the phosphor blend layer 16 and the inner surface of the glass envelope 12. This second layer can be a second phosphor layer comprising a conventional calcium halophosphate phosphor. Alternately or in addition to a second phosphor layer, the second layer can be an ultraviolet reflecting barrier layer as is known in the art. Such a barrier layer can comprise, for example, a mixture of alpha- and gamma-aluminum particles.

The above illustrated dual phosphor layer coatings can be formed by various already known procedures including deposition from liquid suspensions and electrostatic deposition. For example, the base layer of calcium halophosphate phosphor can be deposited on the glass surface from a conventional aqueous suspension including various organic binders and still other adherence promoting agents. Said aqueous suspension is applied and then dried in the conventional manner. A suitable liquid suspension of the present phosphor blend can thereafter be deposited on the dried base phosphor layer again in said conventional manner.

The blue-green emitting phosphor of the present invention is a europium activated strontium aluminate having the general formula $Sr_4Al_{14}O_{25}:Eu^{2+}$ (SAE). The luminescent material described above may be used in many different applications. For example, the material may be used as a phosphor in lamp, in a cathode ray tube, in a plasma display device or in a liquid crystal display. The material may also be used as a scintillator in an electromagnetic calorimeter, in a gamma ray camera, in a computed tomography scanner or in a laser. These uses are meant to be merely exemplary and not exhaustive. In a preferred embodiment, the phosphor is used in a fluorescent light, as described above.

Figure 3:
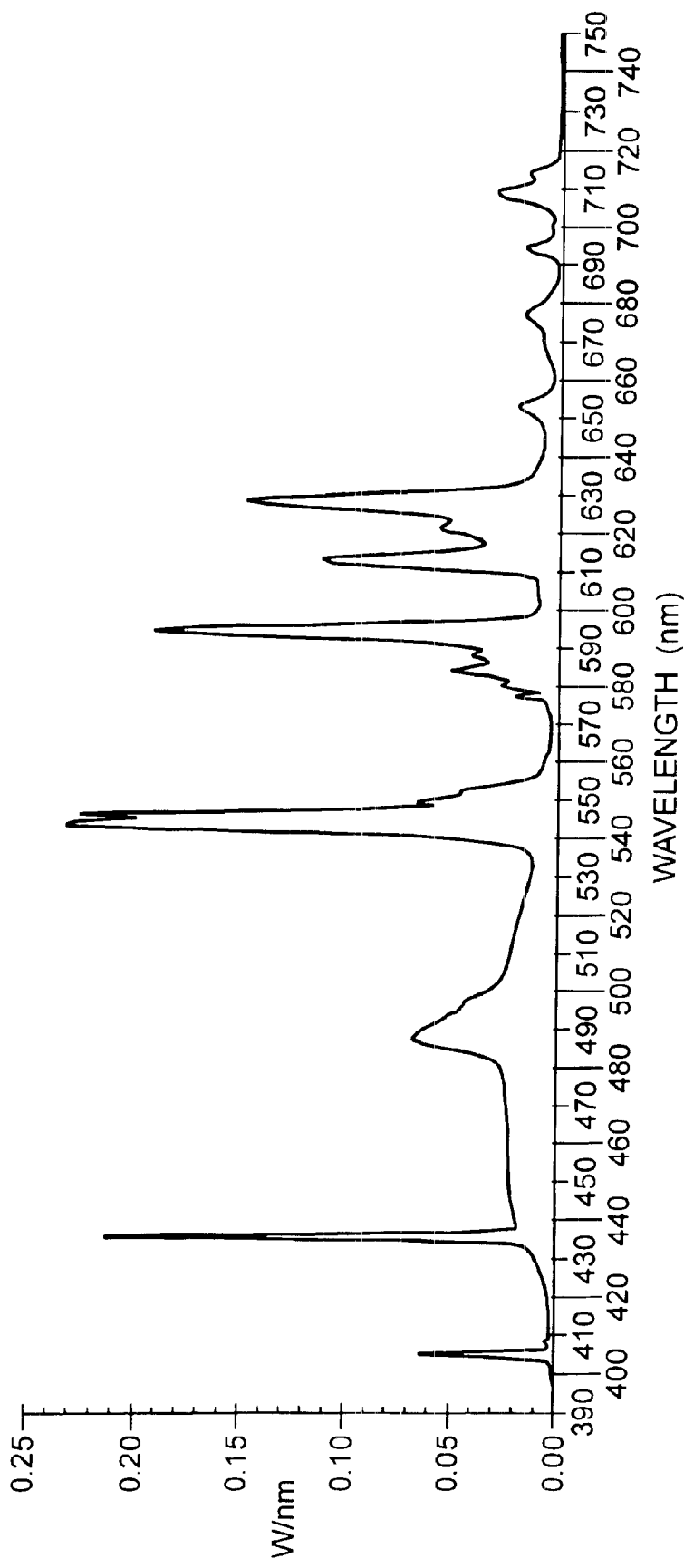
FIG. 3 is a plot of light output versus wavelength for a lamp having a phosphor layer according to the invention.

As seen in FIG. 3, the $Sr_4Al_{14}O_{25}:Eu^{2+}$ phosphor has a peak emission wavelength at about 495 nm and a weak sub band at 410 nm, corresponding to the $4f^7$–$4f^65d$ direct transition of $Eu^{2+}$. The use of $Sr_4Al_{14}O_{25}:Eu^{2+}$, which has its main emission at 495 nm allows for the production of higher CRI light sources than those made using $BaMgAl_{10}O_{17}:Eu^{2+}$ (BAM), which has its main emission at 448 nm. In addition, the spectral distribution of $Sr_4Al_{14}O_{25}:Eu^{2+}$, as exhibited by its symmetrical emission peak, offers significant improvements over current blue or bluish-green phosphors such as $BaMgAl_{10}O_{17}:Eu^{2+}$ or $(Sr,Ba,Ca)_{10}(PO_4)_6Cl_2:Eu^{2+}$, which have maintenance and stability concerns.

The $Sr_4Al_{14}O_{25}:Eu^{2+}$ phosphor may be made by any ceramic powder method, such as a liquid phase (flux) method or a solid state method. Preferably, the method of making the phosphor comprises the following steps. First, compounds of the phosphor material are mixed in a crucible or another suitable container, such as a ball mill. For example, the starting materials may be blended using a ball mill with $ZrO_2$ or yttrium toughened zirconia milling media. The preferred starting phosphor compounds comprise oxides, carbonates, hydroxides, nitrates or oxalates of the metal constituents. For example, to form $Sr_4Al_{14}O_{25}:Eu^{2+}$, strontium carbonate ($SrCO_3$), aluminum oxide (alumina, $Al_2O_3$) or aluminum hydroxide ($Al(OH)_3$), and $Eu_2O_3$ may be mixed in the crucible or ball mill.

The blended materials may then fired in air or a reducing atmosphere for 5–15 hours at 1400 to 1600° C., preferably for 10 hours at 1500° C. to sinter the material. The reducing atmosphere may comprise forming gas (2 percent hydrogen and 98 percent nitrogen). Preferably, the starting materials also contain a flux that promotes the reaction of the starting materials during the firing step to form the ceramic phosphor. Preferably, the flux comprises a halogen compound, such as a fluoride or a chloride compound. The preferred halogen compounds comprise magnesium, aluminum or strontium fluoride or magnesium, strontium, manganese or ammonium chloride. However, the phosphor may be fired without adding a flux. The fired mixture is then coated onto the substrate, such as a lamp bulb. Preferably, a suspension of the mixture particles and a liquid is used to coat the substrate.

The $Sr_4Al_{14}O_{25}:Eu^{2+}$ (SAE) phosphor of the present invention is preferably blended with a red phosphor, a green phosphor, and a blue phosphor to form a phosphor blend 16, for use in the above described fluorescent lamp 10. The $Sr_4Al_{14}O_{25}:Eu^{2+}$ can be blended with any conventional known phosphors to produce a phosphor blend of the present invention capable of emitting white light. Preferably, the $Sr_4Al_{14}O_{25}:Eu^{2+}$ is blended with one or more of each of a red phosphor emitting at about 610 to 640 nm and a peak emission at about 610 to 625 nm, a green phosphor emitting at about 500 nm to about 600 nm with a peak emission at about 535 to about 555 nm, and a blue phosphor emitting at about 440 to about 470 nm. Also included in the blend may be a deep red phosphor emitting at about 600 to about 700 nm and/or a yellow phosphor emitting at about 540 to 590 nm with a peak emission preferably at about 570 nm. Non-limiting examples of green emitting phosphors include rare earth activated phosphors such as Tb—Ce activated magnesium aluminate, yttrium silicate and lanthanum orthophosphate. Non-limiting examples of suitable blue phosphors include europium activated barium magnesium aluminate, strontium chlorophosphate, or strontium barium calcium chlorophosphate. Non-limiting examples of suitable red phosphors include europium activated gadolinium oxide and yttrium oxide. A preferred phosphor blend comprises a mixture of SAE, $LaPO_4:Te,Ce$ (LAP), $Sr_5(PO_4)_3(Cl,F,OH):Eu^{2+}$ (SECA), and $(Y,LA,Gd)BO_3$ (YLGB).

The relative proportions of the individual phosphors in the phosphor blend may be adjusted such that when their emissions are blended, there is produced visible light of predetermined x and y values of CIE coordinates wherein the x value is in the range of about 0.3 to about 0.40, and said y value is in the range of about 0.3 to about 0.40. Additionally, the relative proportions of the components are such that an enhanced color rendering index is produced as compared to a tri-component blend formed from a three phosphor component blend consisting of one each of a green, red and blue phosphor. Although not intended to be limiting, the phosphor blend of the present invention may generally contain about 35 to about 50 percent by weight of a red phosphor, about 5 to about 20 percent of a blue phosphor, about 15 to about 45 percent of a green phosphor and about 5 to about 30 percent of $Sr_4Al_{14}O_{25}:Eu^{2+}$.

Preferably the combination of phosphors result in a predetermined color point where the x value is in the range of about 0.3 to about 0.40, and the y value is within about 0.25 of the Planckian locus. Preferably the phosphor blends have substantially uniform and predetermined brightness and CRI. Preferably the brightness is greater than 70 Lms/W, and the CRI is greater than about 90. The proportions of the phosphor components are adjusted to obtain the high brightness and CRI throughout the desirable color point range so that so that lamps have uniformly high brightness and color point. In addition, the resulting fluorescent lamps will have a correlated color temperature (CCT) of 2500–10000, more preferably 3000–1000 K, depending on the relative amounts of the various phosphors used.

Additional additives may be included in the phosphor blend and can include a dispersion vehicle, binder and one or more of various known non-luminescent additives, including, e.g., alumina, calcium phosphate, thickeners, dispersing agents, and certain borate compounds as are known in the art.

In the coating procedure typically the various phosphor powders are blended by weight. The resulting powder is then dispersed in a water vehicle (which may contain other additives as are known in the art, including adherence promoters such as fine non-luminescent particles of alumina or calcium pyrophosphate) optionally with a dispersing agent as is known in the art. A thickener may be added, typically polyethylene oxide. The suspension is then typically diluted with deionized water until it is suitable for producing a coating of the desired thickness or coating weight. In a two coat configuration utilizing a halophosphate base coat, the halophosphate is first applied to the inside of the tube. The phosphor blend suspension is then applied as a coating to the inside of the glass tube (preferably by pouring the suspension down the inside of a vertically-held tube or pumping the suspension up into same) and heated by forced air until dry, as is known in the art. After the first thin coat or layer is applied, additionally desired thin coats or layers may be applied in the same manner, carefully drying each coat before the next coat is applied. In the present invention the thin layers are built up until the total or cumulative coating thickness is sufficient to absorb substantially all of the UV light produced by the arc. Although not intended to be limiting, this typically corresponds to a thickness of between about 1 and about 25 microns, depending on the exact composition of the phosphor blend and the particle size of the phosphors.

EXAMPLE

The following concentration of phosphors were mixed to create a phosphor blend.

| Phosphor | Weight percent |
| --- | --- |
| SECA | 0.093 |
| YBO$_3$ | 0.429 |
| SAE | 0.180 |
| LAP | 0.298 |

An aqueous suspension of the phosphor blend was prepared and applied on the inside surface of a fluorescent glass envelope. The resulting fluorescent light made with this phosphor blend exhibited a CCT of 4000 K and provided 2882 lumens at a CRI of 94 with a luminous efficacy of 70.6 Lms/W. Luminous efficacy of a source of light is the quotient of the total luminous flux emitted by the total lamp power input as expressed in lumens per watt (LPW or lm/W)

Figure 4:
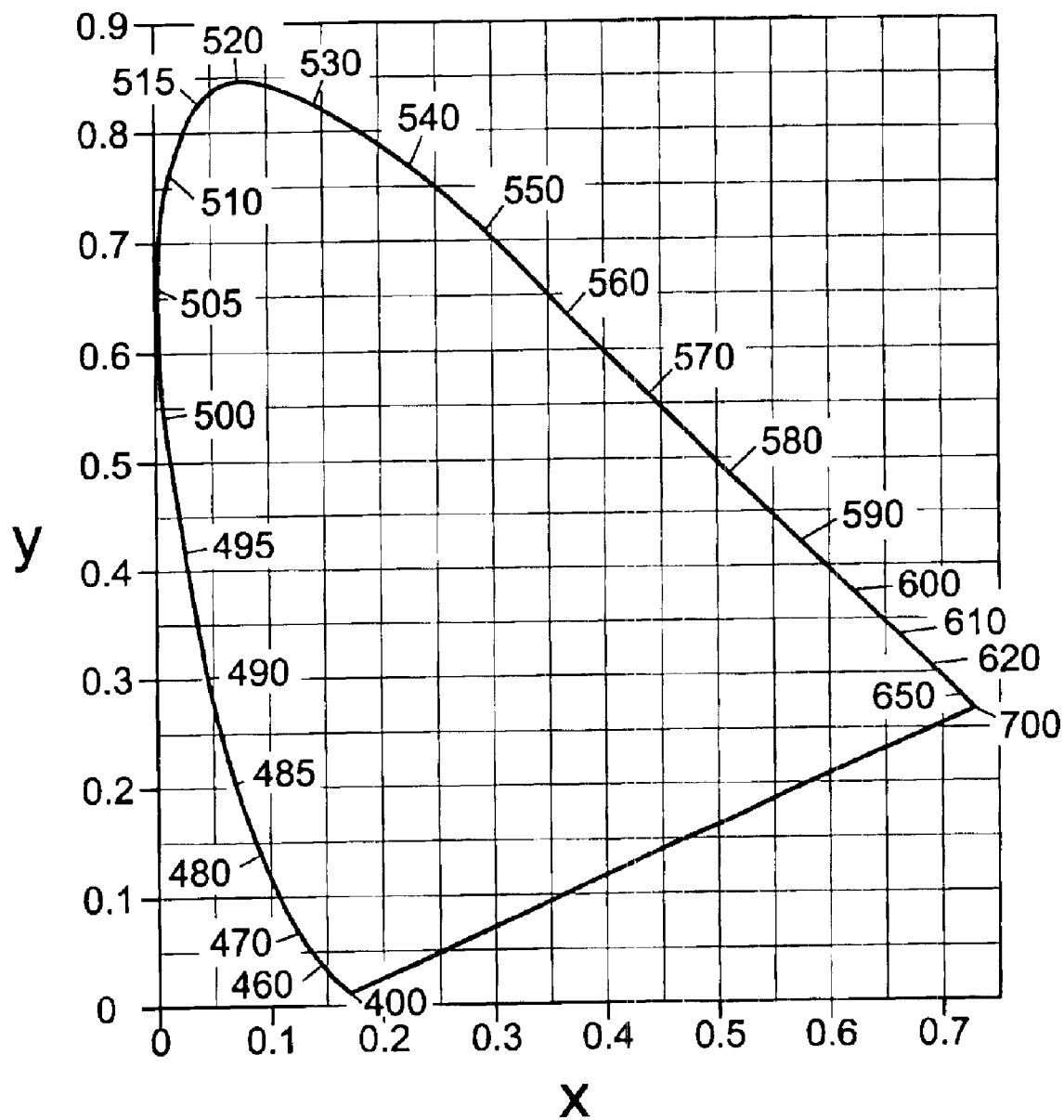
FIG. 4 is a plot of the CIE chromaticity diagram.

FIG. 3 is a plot of light output versus wavelength for a lamp having this phosphor layer comprising a blend of $Sr_4Al_{14}O_{25}:Eu^{2+}$, LAP, SECA and YBO$_3$. The color coordinates of a fluorescent lamp utilizing this phosphor blend are x=0.370, y=0.379 and are shown graphically on the CIE chromaticity diagram in FIG. 4. The chromaticity color coordinates x and y are known in the phosphor art. The solid curve in the diagram shows the monochromatic emission wavelength corresponding to certain x and y coordinates.

Due to SAE's emission at 495 nm, the use of SAE with other phosphors in a fluorescent lamp gives an emission spectrum that is matched to a high CRI spectrum. A conventional red-green-blue triphosphor blend will leave a "hole" in the emission spectrum, which is covered by the SAE emission. This improves the spectral coverage of the lamp and allows the generation of high CRI of 90 and above. In addition, the SAE phosphor shows enhanced stability over comparable phosphors emitting in the same range. Thus, the quality of emitted light from lamps using such a phosphor blend incorporating SAE is exceptional and will not significantly degrade over the course of the lamp life.

In addition, other suitable phosphors such as $GdMgB_5O_{10}:Ce,Tb$ (CBT), $CeMgAl_{10}O_{19}:Ce,Tb$ (CAT), and $Ca_5(PO_4)_3(Cl,F,OH):Sb^{3+},Eu^{2+},Mn^{2+}$ (HALO) can be added to the phosphor blend 16.

Figure 6:
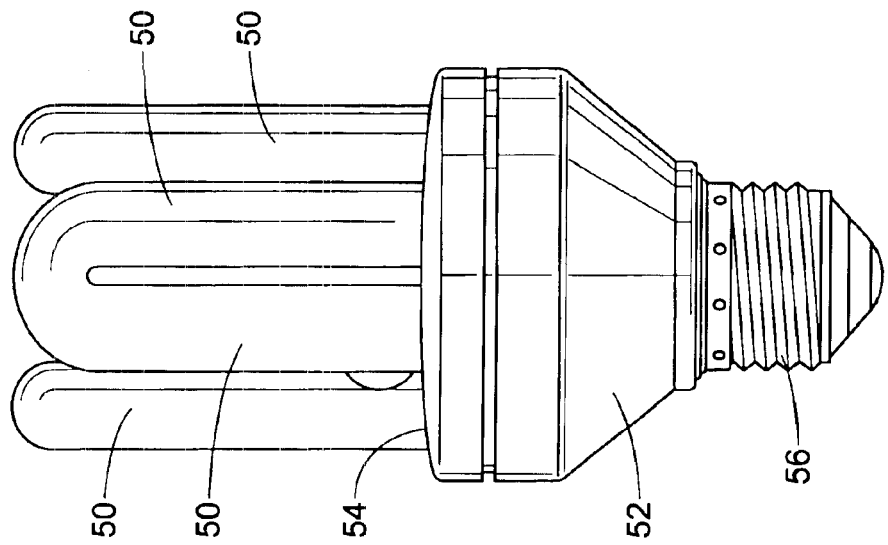
FIG. 6 is a cross-section of an alternate compact fluorescent lamp according to another embodiment of the present invention.
Figure 5:
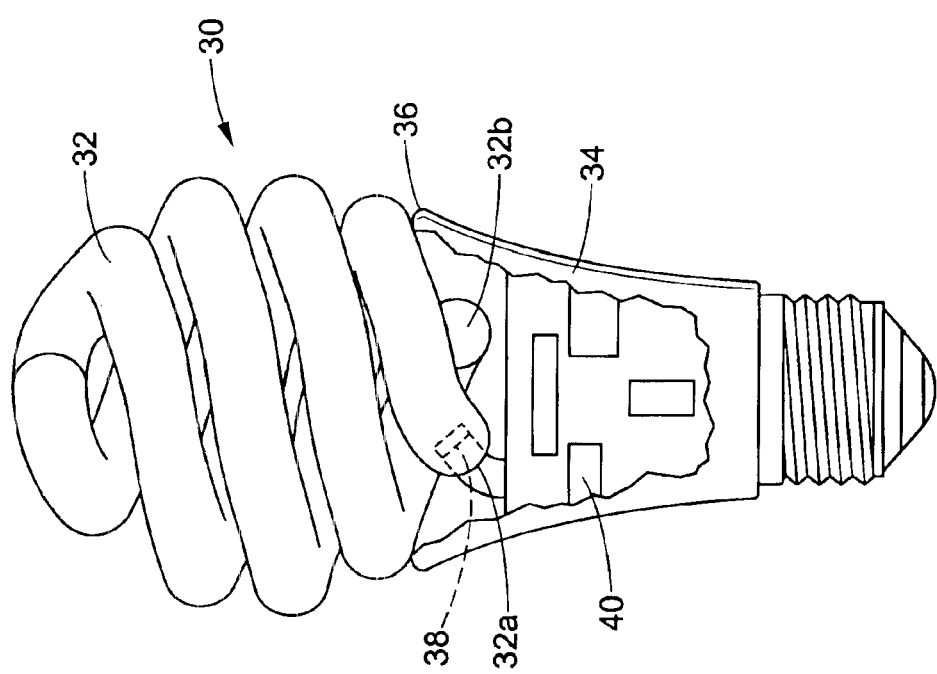
FIG. 5 is a cross-section of a compact fluorescent lamp according to an embodiment of the present invention.

While the invention has been described in detail and with reference to specific embodiments thereof, it will be apparent to one skilled in the art that various changes and modifications can be made therein without departing from the spirit and scope of the invention. For example, as can be seen in FIGS. 5 and 6, the phosphor blend of the present invention can be used in a compact fluorescent lamp arrangement. With reference to FIG. 5, a helical compact fluorescent lamp 30 is shown, having a lamp envelope or tube 32 in a coiled double helix configuration. End portions 32a, 32b enter the top portion 36 of the housing member 34; disposed within the end portions 32a, 32b are electrodes 38 which are electrically coupled to a ballast circuit arrangement 40 mounted within housing member 34. With respect to FIG. 6, a compact fluorescent lamp having a fluorescent tube 50, a housing 52 closed by a cap 54 and, according to the example, a screw base 56 is seen in side view. The compact fluorescent lamp is connected electrically to the mains through the base known in the art, and wires coming from the connection portions of the base are connected to a ballast circuit arranged inside the housing 52 and/or to electrodes of the fluorescent tube 50.

What is claimed is:

1. A fluorescent lamp comprising a first phosphor layer for converting ultraviolet radiation to visible illumination, said layer comprising a red phosphor emitting at about 610 to 640 nm with a peak emission at about 610 to 625 nm, a green phosphor emitting at about 500 nm to about 600 nm with a peak emission at about 535 to about 555 nm, and a blue phosphor emitting at about 440 to about 470 nm and a phosphor having the formula $Sr_4Al_{14}O_{25}$: $EU^{2+}$, wherein said visible light has predetermined color coordinates on the CIE scale wherein the x value is in the range of 0.3 to 0.4 and y is in the range of 0.3 to 0.4.

2. A fluorescent lamp according to claim 1, wherein said lamp exhibits a correlated color temperature of between about 2500 to about 10000 Kelvin and a color rendering index of about 90 to 94.

3. A fluorescent lamp according to claim 1, further comprising a second phosphor layer comprising a halophosphor.

4. A fluorescent lamp according to claim 3, wherein said second phosphor layer comprises a calcium halophosphate.

5. A fluorescent lamp according to claim 1, further comprising a deep red phosphor emitting at about 600 to about 700 nm and/or a yellow phosphor emitting at about 540 to 590 with a peak emission preferably at about 570 nm.

6. A fluorescent lamp according to claim 1, wherein said phosphor layer comprises a blend of $Sr_4Al_{14}O_{25}:Eu_{2+}$, $LaPO_4$:Te, Ce (LAP), $Sr_5(PO_4)_3$(Cl, F, OH):$Eu^{2+}$ (SECA), and (Y, LA, Gd)$BO_3$ (YLGB).

7. A fluorescent lamp according to claim 1, further comprising a UV reflecting barrier layer comprising at least one of alpha- and gamma-aluminum particles.

8. A fluorescent lamp according to claim 1, wherein said visible illumination comprises white light.

9. A fluorescent lamp according to claim 1, wherein said lamp further comprises a glass envelope and wherein said first phosphor layer is deposited on an interior surface of said glass envelope.

10. A fluorescent lamp according to claim 1, wherein said visible light has predetermined color coordinates on the CIE scale wherein the x value is about 0.370 and y is about 0.379.

11. A fluorescent lamp according to claim 1, wherein said lamp has a luminous efficacy of grater than 70 Lms/W.

12. A fluorescent lamp according to claim 1, wherein said phosphor layer comprises about 35 to about 50 percent by weight of said red phosphor, about 5 to about 20 percent of said blue phosphor, about 15 to about 45 percent of said green phosphor and about 5 to about 30 percent of $Sr_4Al_{14}O_{25}:EU_{2+}$.

13. A fluorescent lamp according to claim 1, wherein said lamp is a compact fluorescent lamp.

14. A phosphor blend suitable for use in fluorescent lighting applications, said blend comprising a red emitting phosphor, a green emitting phosphor, a blue emitting phosphor, and $Sr_4Al_{14}O_{25}:Eu^{2+}$, wherein said phosphor blend comprises about 35 to about 50 percent by weight of said red phosphor, about 5 to about 20 percent of said blue phosphor, about 15 to about 45 percent of said green phosphor and about 5 to about 30 percent of $Sr_4Al_{14}O_{25}:Eu^{2+}$.

15. A phosphor blend according to claim 14, wherein said red phosphor emits at about 610 to 640 nm with a peak emission at about 610 to 625 nm, said green phosphor emits at about 500 nm to about 600 rim with a peak emission at about 535 to about 555 nm, and said blue phosphor emits at about 440 to about 470 nm.

16. A phosphor blend according to claim 14, further comprising a deep red phosphor emitting at about 600 to about 700 nm and/or a yellow phosphor emitting at about 540 to 590 with a peak emission preferably at about 570 nm.

17. A phosphor blend according to claim 14, comprising $Sr_4Al_{14}O_{25}:Eu^{2+}$, $LaPO_4$:Te, Ce (LAP), $Sr_5(PO_4)_3$(Cl, F, OH):$Eu^{2+}$(SECA), and (Y, LA, Gd)$BO_3$ (YLGB).

18. A phosphor blend according to claim 14, wherein said phosphor blend is suitable for use in a fluorescent lamp exhibiting a CRI of 90 or greater at a correlated color temperature of from 2500 to 10000 K.

19. A fluorescent lamp comprising a first phosphor layer for converting ultraviolet radiation to visible illumination, said layer comprising a red phosphor emitting at about 610 to 640 nm with a peak emission at about 610 to 625 nm, a green phosphor emitting at about 500 nm to about 600 nm with a peak emission at about 535 to about 555 nm, and a blue phosphor emitting at about 440 to about 470 nm and a phosphor having the formula $Sr_4Al_{14}O_{25}:Eu^{2+}$, wherein said first phosphor layer comprises about 35 to about 50 percent by weight of said red phosphor, about 5 to about 20 percent of said blue phosphor, about 15 to about 45 percent of said green phosphor and about 5 to about 30 percent of $Sr_4Al_{14}O_{25}:Eu^{2+}$.

* * * * *